(12) United States Patent
Watanabe et al.

(10) Patent No.: US 6,707,606 B2
(45) Date of Patent: Mar. 16, 2004

(54) LENS SHEET, PROJECTION SCREEN USING THE SAME, AND METHOD OF MOLDING THE LENS SHEET

(75) Inventors: Hitomu Watanabe, Tokyo-to (JP); Makoto Kimura, Tokyo-to (JP); Ryuji Hashimoto, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 186 days.

(21) Appl. No.: 10/011,107

(22) Filed: Dec. 7, 2001

(65) Prior Publication Data

US 2002/0080482 A1 Jun. 27, 2002

(30) Foreign Application Priority Data

Dec. 22, 2000 (JP) ........................................ 2000-390658
Sep. 21, 2001 (JP) ........................................ 2001-289149

(51) Int. Cl.[7] ............................ G03B 21/60; B32B 3/30; B32B 3/00
(52) U.S. Cl. ........................ 359/452; 359/455; 359/459; 428/167; 428/172
(58) Field of Search ................................ 359/452, 443, 359/455, 459; 428/167, 172

(56) References Cited

U.S. PATENT DOCUMENTS

| 5,361,163 | A | * | 11/1994 | Matsuda et al. ............. 359/452 |
| 5,410,006 | A | * | 4/1995 | Tachibana et al. ........ 526/292.6 |
| 5,714,218 | A | * | 2/1998 | Nishio et al. ............... 428/64.1 |
| 6,324,011 | B1 | * | 11/2001 | Higuchi ...................... 359/627 |
| 6,335,079 | B1 | * | 1/2002 | Osawa et al. ............... 428/141 |
| 6,556,347 | B1 | * | 4/2003 | Murayama et al. ......... 359/453 |
| 6,560,023 | B2 | * | 5/2003 | Kashima et al. ............ 359/599 |

\* cited by examiner

*Primary Examiner*—Russell Adams
*Assistant Examiner*—Magda Cruz
(74) *Attorney, Agent, or Firm*—Ladas & Parry

(57) ABSTRACT

Disclosed are a lens sheet wherein when molding a resin no damage is caused to a mold to there by enable the optical function of light diffusion agent particles to be enhanced, a projection screen, and a method of manufacturing the lens sheet. In a lens sheet having a base material sheet that has a lens formed on at least one surface thereof using an ionizing radiation curable resin, light diffusion agent particles are mixed into the base material sheet and have a mass average particle diameter of 3 to 25 $\mu$m and, when d represents the mass average particle diameter of the light diffusion agent particle and h represents the interval between the trough of the lens configuration of the lens and the surface on the lens-formation surface side of the base sheet material, there hold true the inequality:

$h > d/3$.

8 Claims, 5 Drawing Sheets

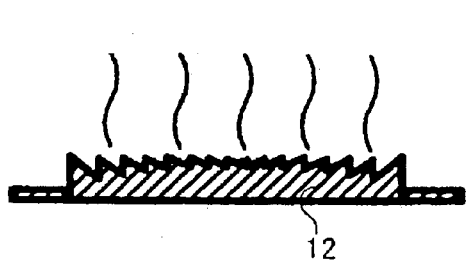
FIG. 4A - PRIOR ART
FIG. 4B - PRIOR ART
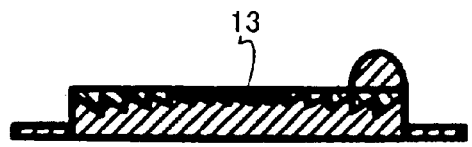
FIG. 4C - PRIOR ART
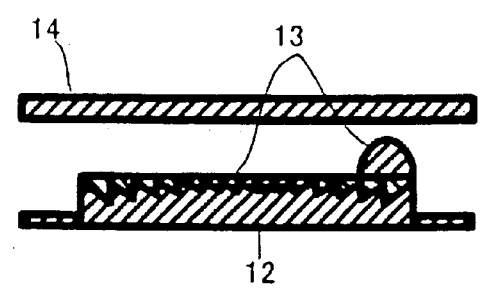
FIG. 4D - PRIOR ART
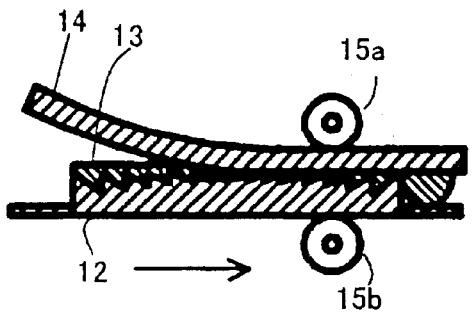
FIG. 4E - PRIOR ART
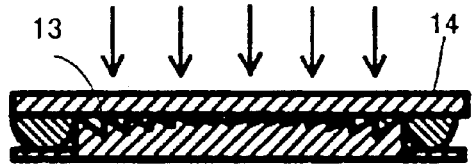
FIG. 4F - PRIOR ART
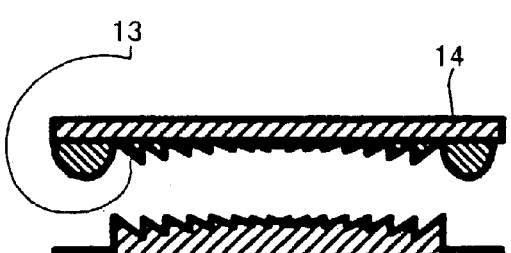
FIG. 4G - PRIOR ART

LENS SHEET, PROJECTION SCREEN USING THE SAME, AND METHOD OF MOLDING THE LENS SHEET

BACKGROUND OF THE INVENTION

1. Field of the Invention

The present invention relates to a projection screen, a lens sheet suitably used therein, and a method of manufacturing the lens sheet.

2. Description of the Related Art

A projection screen is constructed of sheets that include a lenticular lens sheet, a Fresnel lens sheet, etc. The Fresnel lens is for the purpose of making the light emitted and projected from an image source substantially parallel with rays that are directed toward a viewing person side and thereby making the brilliance of the screen uniform. On the other hand, the lenticular lens is for the purpose of diffusing the light so that an image may be viewed over a wide range on the viewing side. Accordingly, it is conventionally practiced in general to mix light diffusion fine particles into the lenticular lens sheet. In contrast to this, as the Fresnel lens sheet, conventionally, there has been used a transparent sheet having no light diffusion agent particles mixed thereinto. In recent years, however, in order to eliminate image obstructions due to the rise surfaces (the leading surfaces) of the Fresnel lens, it has become generally practiced to mix the light diffusion agent particles into the Fresnel lens sheet as well.

These lenticular lens sheet and Fresnel lens sheet have hitherto been manufactured with methods such as a thermal pressing molding, extrusion-molding, thermal polymerization molding, ionizing radiation curing molding, etc. Among these methods, the ionizing radiation curing molding method having a merit in that the mold configuration is excellent in reproducibility; and the molding process time length is short, especially a UV curing molding method that uses ultraviolet rays as ionizing radiation has now been generally practiced.

The ionizing radiation curing molding method, as illustrated in FIGS. 4A to 4G, is constructed of the following processes. A temperature adjustment process (FIG. 4A) that adjusts a mold 12 for a lens sheet to a temperature suitable for molding the lens. The first resin coating process (FIG. 4B) that coats a liquid ionizing radiation curable resin over the entire surface of the temperature-adjusted mold 12. A second resin coating process (FIG. 4C) that coats the liquid ionizing radiation curable resin onto the position on the pressurization starting side that is located on the mold 12. A base material supply process (FIG. 4D) that covers the mold 12 with a base material sheet 14 transmitting ionizing radiation therethrough from over the ionizing radiation curable resin layer 13. A leveling lamination process (FIG. 4E) that presses the base material sheet 14 and the mold 12 with pressurizing rolls 15a, 15b from the pressurization starting end side towards the pressurizing termination end side and thereby laminating the base material sheet 14 onto the ionizing radiation curable resin layer 13 while leveling the same (13). A resin curing process (FIG. 4F) that radiates ionizing radiation onto the ionizing radiation curable resin layer 13 from over the base sheet 14 and cures the same (13). An exfoliation process (FIG. 4G) that exfoliates the cured ionizing radiation curable resin 13 from the mold 12 jointly with the base sheet 14.

In the leveling lamination process (FIG. 4E) of the ionizing radiation curing molding method, the light diffusion agent particles that have protruded from the surface of the base sheet repeatedly contact with the forward end portions of the mold 12; and cause damages to the forward end of the mold. This shortens the service life of the expensive mold 12. That method had these problems. They have recently become more and more prominent. The reason for this is that, as the thickness of the lens sheet becomes gradually smaller owing to a demand for the increase in the fineness of the images, etc., the same amount of light diffusion agent particles is mixed into a smaller thickness of sheet. In addition, there has been a demand for the improvement in the optical function of the light diffusion agent particles.

SUMMARY OF THE INVENTION

Thereupon, the present invention has an object to provide a lens sheet that without, when molding the resin, damaging the mold can enhance the optical function of the light diffusion agent particles, a projection screen, and a method of manufacturing the lens sheet.

Hereinafter, the present invention will be explained. It is to be noted that although in order to make easier the understanding of the present invention the reference symbols in the appended drawings will additionally be written by being bracketed this does not impose a limitation upon the present invention by the illustrated embodiments.

The lens sheet in the first aspect of the present invention is a lens sheet having a base material sheet (BS) that has a lens formed on at least one surface thereof using an ionizing radiation curable resin, wherein light diffusion agent particles (D) are mixed into the base material sheet and have amass average particle diameter of 3 to 25 μm. Here, the wording "mass average particle diameter" is calculated as follows, $$\Sigma nd^4/\Sigma nd^3$$

where "n" represents the number of the particles; and "d" represents the particle diameter.

According to the lens sheet of this aspect, the mass average particle diameter of the light diffusion agent particles has been made small. Therefore, enlarging the interval between the troughs of the lens sheet and the surface of the base material sheet is not needed very much. The amount of ionizing radiation curable resin used can be reduced. In addition, the molding of it becomes also stable. Also, generally, to obtain the same light diffusion at half-maximum angle in case the differences between the light diffusion agent particles and the base material sheet in terms of the refractive index are the same, it is more preferable to use the light diffusion agent particles that is small in the mass average particle diameter than to use the light diffusion agent particles that is large in the mass average particle diameter. This is because it is possible to lessen the adding amount (the weight) of light diffusion agent particles. Therefore the sum of the cross-sectional areas of the light diffusion agent particles, which protrude from the surface of the base material sheet, becomes small. And also because the possibility of damaging the mold becomes small. Accordingly, it is preferable that the mass average particle diameter be 25 μm or less. Provided, however, that in case the mass average particle diameter of the light diffusion agent particles is smaller than 3 μm the scatter angle of the light has dependency upon the wavelength with the result that the lens sheet looks yellowish. Therefore, that range is not preferable.

The lens sheet in the second aspect of the present invention is a lens sheet having a base material sheet that has a lens formed on at least one surface thereof using an ionizing radiation curable resin, wherein light diffusion agent particles are mixed into the base material sheet; and, when d represents the mass average particle diameter of the light diffusion agent particles and h represents the interval between the trough (9) of the lens configuration of the lens and the surface on the lens-formation surface side of the base sheet material, there hold true the inequality:

$h > d/3$

According to the lens sheet of this second aspect, the interval between the trough portion of the lens configuration corresponding to the crest portion of the mold and the surface of the base sheet material has been made large. Therefore, it is not possible that the unevenness of the diffusion material damage the crest portion of the mold. Resultantly, it is possible to prolong the service life of the mold.

The lens sheet in the third aspect of the present invention is a lens sheet having a base material sheet that has a lens formed on at least one surface thereof using an ionizing radiation curable resin, wherein light diffusion agent particles are mixed into the base material sheet and have a mass average particle diameter of 3 to 25 μm and, when d represents the mass average particle diameter of the light diffusion agent particles and h represents the interval between the trough portion of the lens configuration of the lens and the surface on the lens-formation surface side of the base sheet material, there hold true the inequality:

$h > d/3$

The lens sheet that is one in the third aspect is equipped with the features of the lens sheet in the first and second aspects. According to the lens sheet of this aspect, the mass average particle diameter of the light diffusion agent particles has been made small. Therefore, enlarging the interval between the trough portions of the lens sheet and the surface of the base material sheet is not needed very much. The amount of ionizing radiation curable resin used can be reduced. In addition, the molding of it becomes also stable. Also, generally, to obtain the same light diffusion at half-maximum angle in case the differences between the light diffusion agent particles and the base material sheet in terms of the refractive index are the same, it is more preferable to use the light diffusion agent particles that is small in the mass average particle diameter than to use the light diffusion agent particles that is large in the mass average particle diameter. This is because it is possible to lessen the adding amount (the weight) of light diffusion agent particles. Therefore the sum of the cross-sectional areas of the light diffusion agent particles, which protrude from the surface of the base material sheet, becomes small. And also because the possibility of damaging the mold becomes small. Accordingly, the possibility of damaging the mold also becomes small. In addition, the interval between the trough portion of the lens configuration corresponding to the crest portion of the mold and the surface of the base sheet material has been made large. Therefore, it is not possible that the unevenness of the diffusion material damage the crest portion of the mold. Resultantly, it is possible to prolong the service life of the mold.

In the lens sheet of this aspect, the interval between the trough of the lens configuration of the lens and the surface on the lens-formation surface side of the base sheet material may be in the range of from 1 to 300 μm, further more preferably in the range of from 2 to 300 μm.

If such is done like that, since a predetermined amount of interval is provided between the trough portions of the lens sheet and the surface of the base material sheet, even if the light diffusion agent particles each of that is larger in diameter than the mass average particle diameter exist on the surface of the base material sheet, there is no possibility that during the manufacturing process the unevenness of the diffusion material will damage the crest portions of the mold. As a result, it is possible to prolong the service life of the mold. Further, there is also the merit that, when the ionizing radiation curable resin is cured, even if it comes to shrink due to curing, the respective lens elements don't become separated from each other.

Concretely, at the time when the ionizing radiation curable resin is cured, the ionizing radiation curable resin has its volume decreased 5 to 20% due to the polymerization shrinkage. For this reason, the interval between the upper end portion of the configuration of the mold and the lower-side surface of the base material sheet decreases after polymerization in comparison with that before polymerization. At this time, unless that interval is sufficiently wide, owing to the shrinkage of the ionizing radiation curable resin it happens that the so-called "deformation (the formed figure is not same as one to be formed by the mold)" occurs in the configuration of the lens. Or it also happens that the portions having no ionizing radiation curable resin occur between the lens element and the lens element. Or it happens that at the time of exfoliation the lens element is left to remain on the mold. Accordingly, even after curing, it is preferable that the interval between the upper end portion of the mold configuration and the lower-side surface of the base material sheet be at least 1 μm, preferably 2 μm or more. Also, the reason why this interval is made to be a predetermined, or smaller than predetermined, amount is that the portion corresponding to that interval makes no optical contribution and, therefore, when that portion is made greater in thickness than necessary, the lens sheet as a whole unpreferably becomes thick.

Also, in the above-described aspect, the light diffusion agent particles may be made to be resin beads.

If this is done like that, even if the diffusion beads the particle diameter of that is considerably greater than the mass average particle diameter are mixed to protrude from the surface of the base material sheet, since the material quality of the light diffusion agent particles is softer than that of the mold, no damages are caused to the mold. The service life of the mold can thereby be prolonged.

Also, in the above-described aspect, further, the lens maybe formed on the other surface, as well, of the base material sheet.

If the construction is made like that, it is possible to impart a new optical function to the base material sheet.

Further, in each of the above-described aspects, the base material sheet can also be constructed so that it is formed through extrusion molding.

In case this construction is made like that, manufacturing the base material sheet continuously becomes possible, which contributes to the enhancement in the productivity and the reduction in the manufacturing cost.

Also, another aspect of the present invention is a projection screen equipped with the lens sheet according to any one of the above-described aspects.

In this aspect, it is possible to construct the projection screen with the use of the lens sheet equipped with the above-described features.

Further, another aspect of the present invention is a method of molding a lens sheet, the method of molding a lens sheet including a process of forming a base material sheet by sheet-forming a resin wherein light diffusion agent particles have been kneaded, through the use of an extruder, a process of coating an ionizing radiation curable resin onto a mold the surface of that has formed thereon a configuration inverse to that of the lens configuration, a process of further laminating the base material sheet from over the ionizing radiation curable resin that has been coated on the mold, a process of radiating ionizing radiation onto the ionizing radiation curable resin and curing it to thereby integrate it with the base material sheet, and a process of exfoliating the integrated ionizing radiation curable resin with the base material sheet from the mold, wherein, when d represents the mass average particle diameter of the light diffusion agent particles and h represents the interval between the forward end of the lens-formation surface of the mold and the surface on the lens-molding surface side of the base material sheet, the base material sheet is laminated further from over the ionizing radiation curable resin that has been coated on the mold while maintaining the inequality of $h > d/3$.

According to this method of molding the lens sheet, since the interval between the forward end of the lens-formation surface of the mold and the surface on the lens-molding surface side of the base material sheet has been made large with respect to the mass average particle diameter of the light diffusion agent particles, it does not happen that the unevenness of the diffusion material damage the crest portion of the mold and this enables the prolongation of the service life of the mold.

The above-described functions and advantages of the present invention will become apparent from the embodiments that will be explained next.

BRIEF DESCRIPTION OF THE DRAWINGS

FIGS. 4A to 4G are views illustrating lens sheet-molding processes; and

DESCRIPTION OF THE PREFERRED EMBODIMENTS

Hereinafter, an embodiment of the present invention will be explained with reference to the appended drawings.

Figure 1:
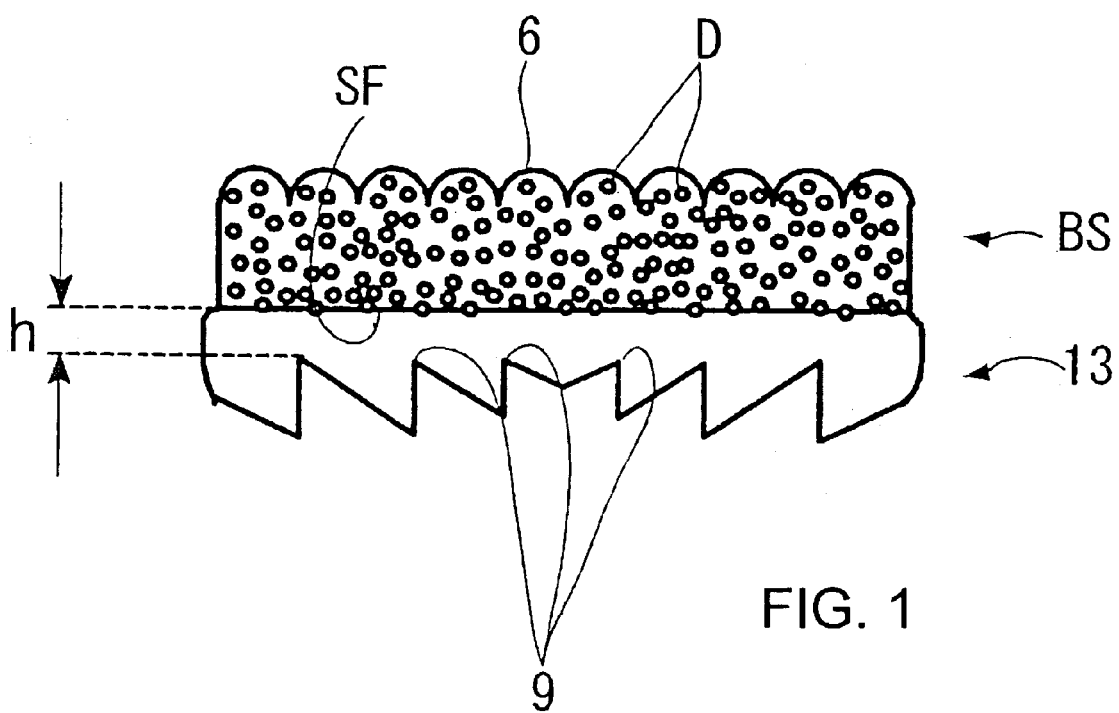
FIG. 1 is a sectional view of a lens sheet of the present invention.

As illustrated in FIG. 1, a lens sheet of the present invention is constructed of a base material sheet BS having light diffusion agent particles D mixed therein and a lens layer (ionizing radiation curable resin) 13 that has been formed on one surface of the base material sheet BS using a cured material of the ionizing radiation curable resin. On the other surface of the base material sheet BS there is formed an unevenness 6 configuration (e.g. a lenticular lens) as required. This unevenness configuration may be simultaneously formed when manufacturing the base material sheet BS, or may be formed by working that is performed later. Also, for enhancing the adherence between the ionizing radiation curable resin 13 and the base material sheet BS, a primer layer may be formed between those two.

Figure 2:
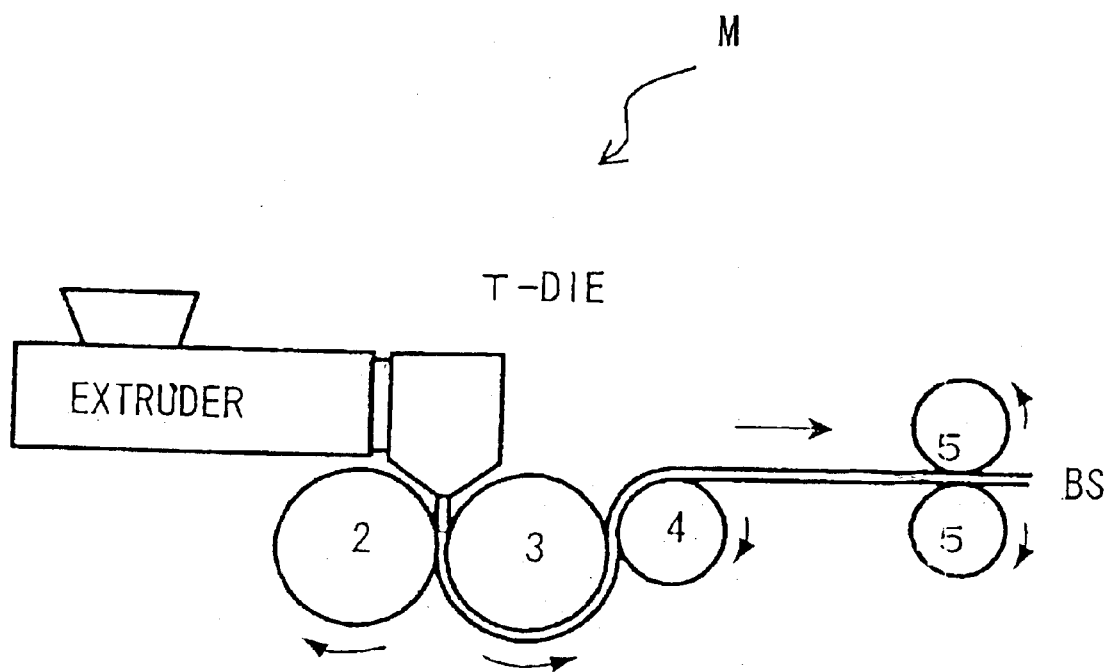
FIG. 2 is a view illustrating an extrusion-molding device for a base material sheet.

The base material sheet BS of the lens sheet used in the present invention is manufactured using an extrusion molding device M illustrated in FIG. 2. The extrusion molding device M includes an extruder, a T die that is a resin feeder, polishing rolls 2, 3, and 4 that are disposed at a discharge outlet of the T die in the way they are adjacent to one another and in parallel with one another, and take-up rolls 5, 5 that are disposed in the way of being spaced apart from the roll 4. The gap between the polishing rolls 2 and 3 is set to be slightly smaller than the thickness of the base material sheet BS that is to be manufactured.

The surface of the roll 2 is formed so as to have a flat surface. On the other hand, the surface of the roll 3, in order to impart an optical function to the other surface of the base material sheet, has formed thereon according to the necessity an mold unevenness configuration such as an inverse configuration to that of a lenticular lens, a mat surface, an embossment, etc. For adjusting the temperatures on the surfaces of the rolls 2, 3, and 4 to predetermined temperatures, within each of these rolls 2, 3, and 4 a piping for adjustment of the temperature is disposed, whereby hot water or heated oil is passed, as the heating medium, through it.

Also, in case precise control of the thickness is demanded, additionally providing each of the rolls 2, 3, and 4 with a hydraulic roll-bending device or with a roll crown is permitted. In addition, in case intentionally warping the base material sheet BS, setting the temperature of the roll 4 to be higher or lower than that of the roll 3 is also performed.

First, a molten resin (e.g. acrylic resin) that has been heated within the extrusion molding device M up to a predetermined, or higher than predetermined, temperature to become a softened state is extruded from the T die while it is being maintained at a temperature of 200 to 250° C. And that molten resin forms a resin pool between the rolls 2 and 3 and is carried to the roll 4 while it is being formed as a sheet along the rotation of the roll 3. The rotation speed of each of the rolls 2, 3, and 4 is set to have a value that corresponds to a take-up speed that is 10 to 25% higher than the extrusion speed of the T die. For this reason, the resin sheet is kept in a state of having been receiving a tensile stress on the roll 3. Each roll, in order to cool the softened resin, has its temperature adjusted to a temperature that is lower than that of the softened resin. The three pieces of rolls 2, 3, and 4 are each making its regular rotation (in the direction indicated by the arrows in FIG. 2). The softened resin is cooled through its contact with each of the rolls 2, 3, and 4, with the result that the solidification commences and proceeds. The resin in a semi-softened state that has been pressed by the rolls 2 and 3 is fed on so that it may be wound onto the roll 3. Therefore, the surface and the neighborhood on a side where the resin has been adhered to the roll 3 are cooled and solidified earlier than the surface on the opposite side. The sheet-like resin in a softened state is taken up onto the roll 4 next and the surface on that opposite side is cooled and solidified. The sheet resin in the semi-softened state is further taken up onto take-up rolls 5, 5. During a time period from the leaving from the roll 4 until take-up onto the rolls 5, 5, the resin finishes being completely solidified, whereby a plate-like base material sheet is formed.

During the meantime, the surface on the side where the resin contacts with the roll 3 is bound to contact with the same 3 and therefore the above-described configuration of the surface of the roll 3 is faithfully transferred onto the resin 3. On the other hand, the surface contacting with the roll 2 is released from the binding of the roll 2. Therefore, even if a predetermined configuration is formed on the surface of the roll 2, that configuration is not faithfully transferred onto the resin. For this reason, generally, in case forming some or other unevenness configuration on a side, as well, that is opposite to that where the lens is formed with ionizing radiation curable resin, the roll 2 side of the resin comes to have a surface where that lens is formed with ionizing radiation curable resin.

Figure 3A:
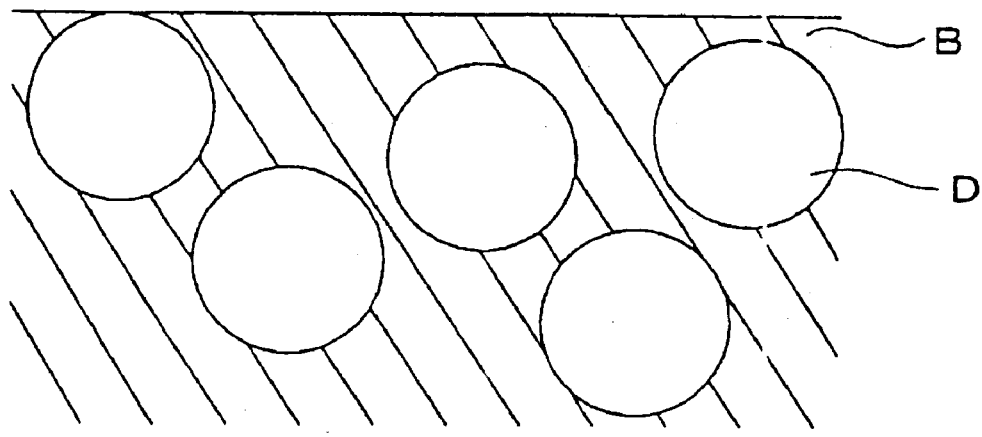
FIGS. 3A and 3B are sectional views, one A of which illustrates the light diffusion agent particles in a base material resin in a softened state and the other B of which illustrates the light diffusion agent particles in a solidified state.
Figure 3B:
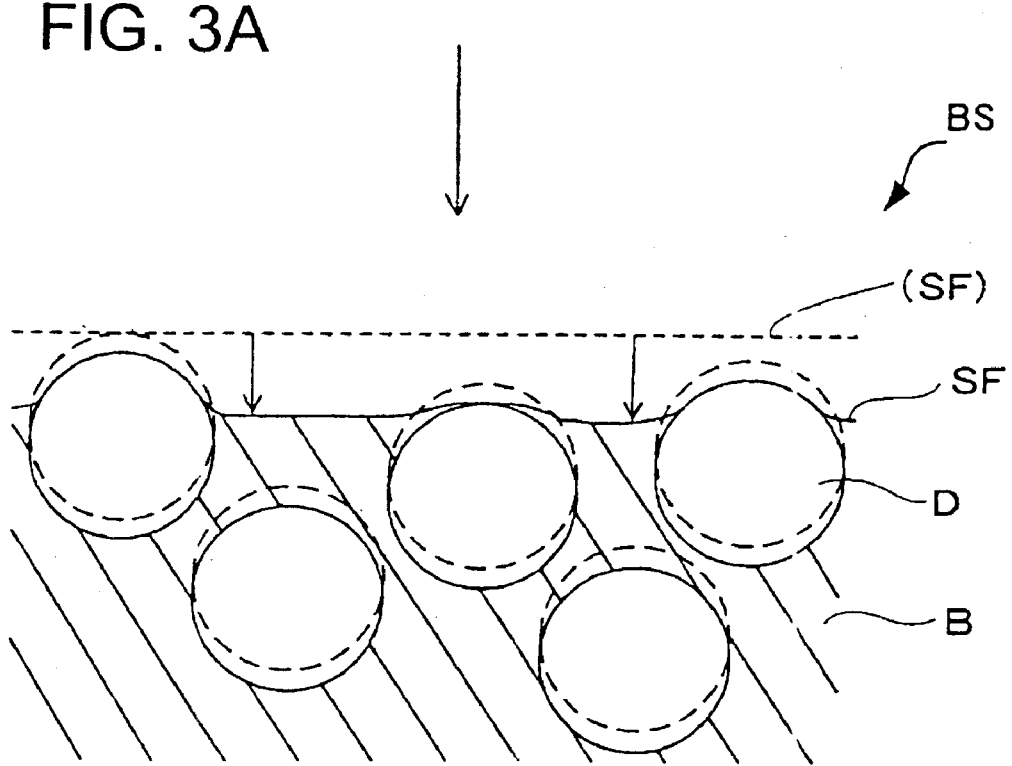

Next, an explanation will be given of the microscopic behavior that occurs at the time of forming the base material sheet BS with reference to FIGS. 3A and 3B. The base material sheet BS is constructed of a base material resin layer B and light diffusion agent particles D that has been blended into it in the way of being dispersed therein. In FIGS. 3A and 3B, the 3A illustrates the base material sheet in a softened (molten) state or in a semi-molten state while the 3B illustrates the base sheet BS that has almost finished being solidified. In the state of FIG. 3A, the light diffusion agent particles D exist in the manner in that they are completely dispersed within the base material resin layer B, in other words dispersed in the interior of the surface SF.

On the other hand, during the molding of the base material sheet illustrated in FIG. 2, the resin that has been extruded in the molten state, when it is on the roll 3, is pulled in the direction of flow while the side thereof contacting with the roll 3 is being earlier cooled than the surface thereof on the opposite side. For this reason, the thickness of the resin decreases with the result that on the surface side where the resin is released without being bound by the roll the following phenomenon occurs. Namely, of the light diffusion agent particles D that have been dispersed within the base material resin layer B in the softened state, those which have been located in the vicinity of the surface partly outwardly protrude from a surface SF of the base material resin layer B due to the decrease in the thickness of this base material resin layer B.

This state of outward extrusion is illustrated in FIG. 3B. The upper-surface-side surface SF represents the surface on a side that is opposite to the side where the resin layer B contacts with the roll 3 (see FIG. 2). In FIG. 3B, the upper-surface-side surface (SF) in a state corresponding to the molten state (see FIG. 3A) is indicated in a broken line, while the upper-surface-side surface SF in a state after the decrease in the thickness of the base material resin layer is indicated in a solid line. Owing to the cooling and solidification as well as to the reception of the tensile stress from the roll 3, the thickness of the base material resin layer B decreases. On the other hand, simultaneously, the light diffusion agent particles D are also moved to the roll 3 side (in the downward direction of the FIG. 3B) due to that affection. However, the amount of movement of the light diffusion agent particles D is smaller in comparison with the decrease in the thickness of the base material resin layer B, so a part there of outwardly protrudes from the surface SF of the base material resin layer 3. Thereafter, since the protrusion portion is pushed in again when the surface SF side is cooled by the roll 4, the protrusion of the light diffusion agent particle D in the vicinity of the surface, even at maximum, becomes ⅓ or less of the volume thereof.

Figure 5:
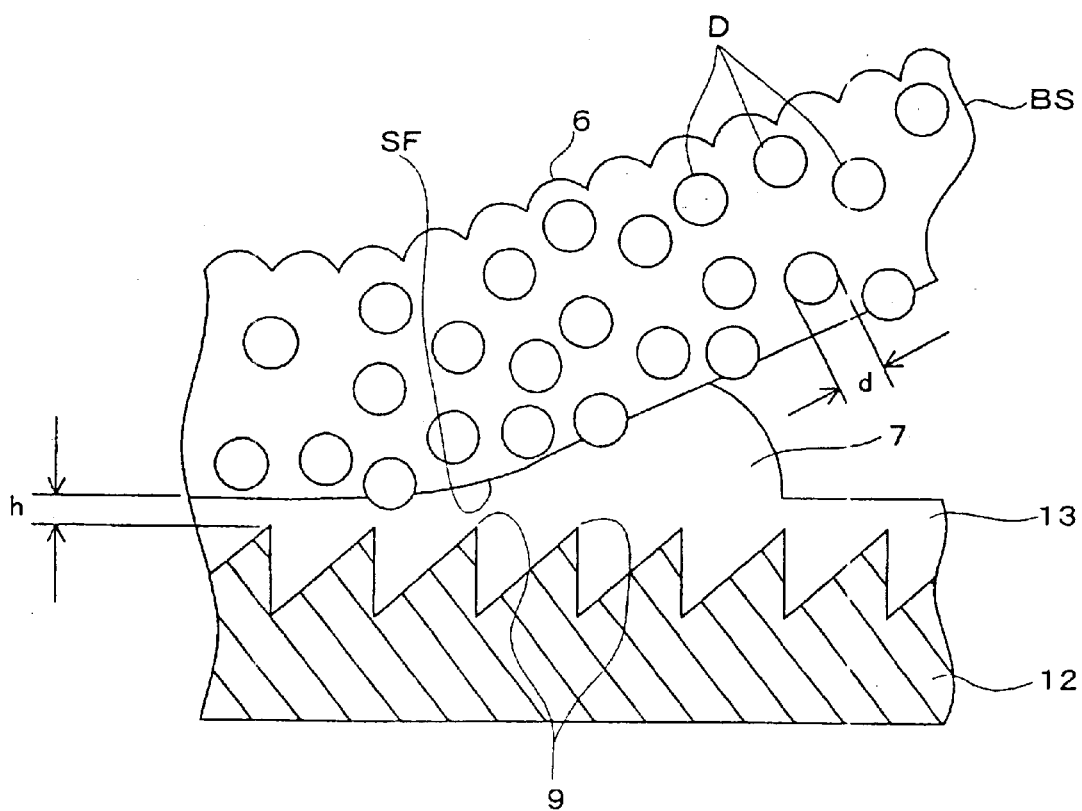
FIG. 5 is a view illustrating the relationship among ionizing radiation curable resin, base material sheet, the mold and the light diffusion agent particles in the leveling lamination process for molding the lens.

Next, the lens surface formation processes that use the ionizing radiation curable resin of the lens sheet of the present invention will be explained below with reference to FIGS. 4A to 4G. First, onto a mold 12, a liquid UV curable resin is dropped (see FIGS. 4A to 4C). Next, from over the mold 12, the base material sheet BS is supplied and is pressed between and by pressing (nip) rolls (see FIGS. 4D to 4E). The detailed relationship among the ionizing radiation curable resin 7, base material sheet BS, the mold 12, and the light diffusion agent particles D is illustrated in FIG. 5. In FIG. 5, on the upper surface of the base material sheet BS there is formed a configuration (e.g. a lenticular lens) surface 6 transferred from the roll 3 (see FIG. 2). The lower surface of the base material sheet BS is the upper surface in FIG. 3B and, below this surface SF, part of the light diffusion agent particles D protrudes. The ionizing radiation curable resin 7 that has been supplied to a pressurization start end portion (left outer side of FIG. 5) of the mold 12 is pressed with the nip rolls (not illustrated) via the base material sheet BS. It then is leveled from the pressurization start end side toward the pressurization termination end side. The interval h between the upper end portion 9 of the configuration of the mold and the lower-side surface SF of the base material sheet BS can be adjusted by controlling the physical property and supplying amount of the ionizing radiation curable resin 7, the thickness of the base material sheet BS, the nipping pressure, etc. On the upper surface of the mold 12 there is formed an inverse unevenness configuration to that of the lens (an example of the Fresnel lens is illustrated here). This inverse unevenness configuration is transferred to the lower surface of the ionizing radiation curable resin layer 13, so that a Fresnel lens configuration is formed. After that, ionizing radiation is radiated onto the ionizing radiation curable resin layer 13, whereby the base material sheet BS having had its ionizing radiation curable resin layer 13 cured is integrated with the lens layer based on the use of the ionizing radiation curable resin. Thereafter, the lens sheet is exfoliated from the mold 12 (see FIGS. 4F to 4G).

If in the above-described construction the mass average particle diameter of the light diffusion agent particles D is made 25 μm or less, or further preferably 17 μm less, or further more preferably 12 μm or less, the protruding portions of the light diffusion agent particles D from the surface SF of the base material sheet BS each become small, with the result that at the time of the nip process these protruding portions are prevented from contacting with the forward end portion 9 of the mold and thereby damaging the mold 12. Also, even when the construction has been made like that, it is preferable to use a material as the light diffusion agent particles D that is softer than the material of the mold. The reason for this is that, generally, the light diffusion agent particles mixed into the base material resin layer B of the lens sheet have a particle-diameter distribution in which particles the diameter of that is larger than the average particle diameter also exist.

As this average particle diameter, there exist several kinds of average particle diameters according to the methods for measurement. However, the average particle diameter that is generally used is a mass median diameter that is situated at the position of 50% in the cumulative frequency distribution as obtained with the calculation being performed based on the weight. The "mass average particle diameter" is defined as being equivalent to the "weight average diameter" that appears in a "Major Chemical Dictionary (Kagaku Daijiten)" (published by Kyoritsu Shuppan Co. Ltd.). Since the mass average particle diameter is measured based on the mass, the number of the particles the diameters of that are greater than those of the particles having the mass average particle diameter is less than 10% or so of the whole particles. Therefore, that number is much smaller than the number of the particles the diameters of that are smaller than those of the particles having the mass average particle diameter. Accordingly, the probability that in FIG. 3A in the surface, or its neighborhood, of the upper side (the lens formation surface side) the particles whose diameters are greater than those of the particles having the mass average particle diameter exit becomes considerably small. However, although the probability of existence is small, it is not zero. Therefore, it can happen that the particles whose diameters are greater than those of the particles having the mass average particle diameter protrude from the surface of the base material resin layer B. There is the possibility that such particles may contact with the mold. For preventing damaging the apex portion of the mold even in such a case, it is effective to make the hardness of the light diffusion agent particles smaller than that of the mold. As the materials of such soft light diffusion agent particles, there can be used light transmission resin materials such as acrylic resin, methacrylic resin, silicone resin, MS (styrene-methacrylate resin), polyethylene, polypropylene, polystyrene, polyamide-based synthetic fibers, various kinds of vinyl resins, etc.

In the above-described resin formation process, when h represents the interval between the lower surface SF of the base material sheet and the forward end 9 of the lens formation surface of the mold 12; and d represents the mass average particle diameter of the light diffusion agent particles, it is preferable that the h and d be set so that the relationship of h>d/3, further preferably h>d/2, or further more preferably h>d may be established. By the construction being made like that, the forward end 9 of the mold is prevented from being damaged due to the contact with the light diffusion agent particles D protruding from the surface SF of the base material sheet during the resin formation process.

[Embodiments]

Hereinafter, for making the understanding of the present invention easy, it will be explained using its examples in more detail.

EXAMPLE 1

Pellets, prepared by mixing 0.06 mass % of styrene beads having a mass average particle diameter of 12 μm into impact-resisting methacrylic resin (the Sumipex HT having a refractive index of 1.51, produced by Sumitomo Chemical Co. Ltd.) containing no ultra-violet ray absorbent, as the light diffusion agent particles, were extrusion-molded using the extruder M illustrated in FIG. 2 to thereby obtain a base material sheet.

An inverse configuration to that of a Fresnel lens was cutting-worked on the surface of a flat brass plate, and the cut-worked surface thereof was chrome-plated to a thickness of 1 to 2 μm. Thereby, a Fresnel lens formation die was obtained.

Using the molding method illustrated in FIGS. 4A to 4G, 100 sheets of 50-inch Fresnel lens for use for a projection screen were manufactured. The cross section of each molded Fresnel lens sheet was observed using a microscope. As a result, the interval between the base material sheet and the trough portion of the lens was 6 to 7 μm, and the protrusions of the light diffusion agent particles from the base material sheet all fell within this range. Next, the claws of the mold were checked and no outstanding claws were found out.

EXAMPLE 2

Excepting that as the light diffusion agent particles there were used silicone beads whose mass average particle diameter was 6 μm, in the same way as in Example 1 100 sheets of Fresnel lens were manufactured. The cross section of each molded Fresnel lens sheet was observed using a microscope. As a result, the protrusions of the light diffusion agent particles from the base material sheet all fell within the gap between the base material sheet and the trough portion of the lens. The claws were not found out, either.

Comparative Example

Excepting that as the light diffusion agent particles there were used glass beads whose mass average particle diameter was 25 μm, in the same way as in Example 1 100 sheets of Fresnel lens were manufactured. The claws of the die were checked. As a result, claws were fount out at several tens of the crest portions of the Fresnel die.

EXAMPLE 3

Excepting that as the light diffusion agent particles there were used glass beads whose mass average particle diameter was 6 μm, in the same way as in Example 1 100 sheets of Fresnel lens were manufactured. The cross section of each molded Fresnel lens sheet was observed using a microscope. As a result, the protrusions of the light diffusion agent particles from the base material sheet all fell within the gap between the base material sheet and the trough portion of the lens. The claws were not found out, either.

Reference Example

Excepting that as the light diffusion agent particles there were used acrylic beads whose mass average particle diameter was 35 μm, in the same way as in Example 1 100 sheets of Fresnel lens were manufactured. Although no claws of the die were found out, in the trough portions of the lens it was found out that deformed portions existed at the light diffusion agent particles protruding from the base material sheet.

The present invention is not limited to the above-described embodiments and Examples but permits various changes to be suitably made without departing from the subject matter and idea of the present invention readable from the scope of the claims and the entire specification. The lens sheets, projection screens, and method of manufacturing these lens sheets, which follow such changes, are included within the technical range of the present invention.

As has been explained above, according to a lens sheet having a base material sheet that has a lens formed on at least one surface thereof using an ionizing radiation curable resin, wherein light diffusion agent particles are mixed into the base material sheet and have a mass average particle diameter of 3 to 25 μm, the mass average particle diameter of the light diffusion agent particles has been made small. Therefore, enlarging the interval between the troughs of the lens sheet and the surface of the base material sheet is not needed very much. The amount of ionizing radiation curable resin used can be reduced. In addition, the molding of it becomes also stable. Also, generally, to obtain the same light diffusion at half-maximum angle in case the differences between the light diffusion agent particles and the base material sheet in terms of the refractive index are the same, it is more preferable to use the light diffusion agent particles that is small in the mass average particle diameter than to use the light diffusion agent particles that is large in the mass average particle diameter. This is because it is possible to lessen the adding amount (the weight) of light diffusion agent particles. Therefore the sum of the cross-sectional areas of the light diffusion agent particles, which protrude from the surface of the base material sheet, becomes small. And also because the possibility of damaging the mold becomes small.

Also, according to a lens sheet having a base material sheet that has a lens formed on at least one surface thereof using an ionizing radiation curable resin, wherein light diffusion agent particles are mixed into the base material sheet; and, when d represents the mass average particle diameter of the light diffusion agent particles and h represents the interval between the trough of the lens configuration of the lens and the surface on the lens-formation surface side of the base sheet material, there hold true the inequality:

$h>d/3$, the interval between the trough portion of the lens configuration corresponding to the crest portion of the mold and the surface of the base material sheet has been made large with respect to the mass average particle diameter of the light diffusion agent particles. Therefore, it is not possible that the unevenness of the diffusion material damage the crest portion of the mold. Resultantly, it is possible to prolong the service life of the mold.

Further, according to a lens sheet having a base material sheet that has a lens formed on at least one surface thereof using an ionizing radiation curable resin, wherein light diffusion agent particles are mixed into the base material sheet and have a mass average particle diameter of 3 to 25 μm and, when d represents the mass average particle diameter of the light diffusion agent particles and h represents the interval between the trough portion of the lens configuration of the lens and the surface on the lens-formation surface side of the base sheet material, there hold true the inequality:

$h>d/3$, the mass average particle diameter of the light diffusion agent particles has been made small. Therefore, enlarging the interval between the trough portions of the lens sheet and the surface of the base material sheet is not needed very much. The amount of ionizing radiation curable resin used can be reduced. In addition, the molding of it becomes also stable. Also, generally, to obtain the same light diffusion at half-maximum angle in case the differences between the light diffusion agent particles and the base material sheet in terms of the refractive index are the same, it is more preferable to use the light diffusion agent particles that are small in the mass average particle diameter than to use the light diffusion agent particles that are large in the mass average particle diameter. This is because in the former case it is possible to lessen the adding amount (the weight) of light diffusion agent particles. Therefore the sum of the cross-sectional areas of the light diffusion agent particles, which protrude from the surface of the base material sheet, becomes small. And also because the possibility of damaging the mold becomes small. Accordingly, the possibility of damaging the mold also becomes small. In addition, the interval between the trough portion of the lens configuration corresponding to the crest portion of the mold and the surface of the base sheet material has been made large with respect to the mass average particle diameter of the light diffusion agent particles. Therefore, it is not possible that the unevenness of the diffusion material will damage the crest portion of the mold. Resultantly, it is possible to prolong the service life of the mold.

In the lens sheet of the above-described mode, if setting the interval between the trough of the lens configuration of the lens and the surface on the lens-formation surface side of the base sheet material to be in the range of from 1 to 300 μm, since a predetermined amount of interval is provided between the trough portions of the lens sheet and the surface of the base material sheet, even if the light diffusion agent particles each of that is larger in diameter than the mass average particle diameter exist on the surface of the base material sheet, there is no possibility that during the manufacturing process the unevenness of the diffusion material will damage the crest portions of the mold. As a result, it is possible to prolong the service life of the mold.

Also, in the above-described mode, if the light diffusion agent particles are resin beads, even when the diffusion beads the particle diameter of that is considerably greater than the mass average particle diameter are mixed to protrude from the surface of the base material sheet, since the material quality of the light diffusion agent particles is softer than that of the mold, no damages are caused to the mold. The service life of the mold can thereby be prolonged.

Also, in the above-described mode, further, if it is constructed that the lens is formed on the other surface, as well, of the base material sheet, it is possible to impart a new optical function to the base material sheet.

Further, in the above-described modes, if it is constructed that the base material sheet is formed through extrusion molding, manufacturing the base material sheet continuously becomes possible, which contributes to the enhancement in the productivity and the reduction in the manufacturing cost.

What is claimed is:

1. A lens sheet having a base material sheet that has a lens formed on at least one surface thereof using an ionizing radiation curable resin, wherein light diffusion agent particles are mixed into the base material sheet; and, when d represents a mass average particle diameter of the light diffusion agent particles and h represents an interval between a trough of the lens configuration of the lens and a surface on the lens-formation surface side of the base sheet material, there hold true an inequality: h>d/3.

2. A lens sheet having a base material sheet that has a lens formed on at least one surface thereof using an ionizing radiation curable resin, wherein light diffusion agent particles are mixed into the base material sheet and have a mass average particle diameter of 3 to 25 μm and, when d represents a mass average particle diameter of the light diffusion agent particles and h represents an interval between a trough of the lens configuration of the lens and a surface on the lens-formation surface side of the base sheet material, there hold true an inequality: h>d/3.

3. A lens sheet according to claim 1 or 2, wherein the interval between the trough of the lens configuration of the lens and the surface on the lens-formation surface side of the base sheet material is in the range of from 1 to 300 μm.

4. A lens sheet according to any one of claims 1 or 2, wherein the light diffusion agent particles are resin beads.

5. A lens sheet according to any one of claims 1 or 2, wherein the lens is also formed on the other surface, as well, of the base material sheet.

6. A lens sheet according to any one of claims 1 or 2, wherein the base material sheet is formed by extrusion molding.

7. A projection screen equipped with the lens sheet as described in any one of claims 1 or 2.

8. A method of molding a lens sheet, the method of molding the lens sheet including a process of forming a base material sheet by sheet-forming a resin wherein light diffusion agent particles have been kneaded, through a use of an extruder, a process of coating an ionizing radiation curable resin onto a mold the surface of that has formed thereon a configuration inverse to that of the lens configuration, a process of further laminating the base material sheet from over the ionizing radiation curable resin that has been coated on the mold, a process of radiating ionizing radiation onto the ionizing radiation curable resin and curing it to thereby integrate it with the base material sheet, and a process of exfoliating the integrated ionizing radiation curable resin with the base material sheet from the mold, wherein, when d represents a mass average particle diameter of the light diffusion agent particles and h represents an interval between a forward end of a lens-formation surface of the mold and a surface on a lens-molding surface side of the base material sheet, the base material sheet is laminated further from over the ionizing radiation curable resin that has been coated on the mold while maintaining an inequality of $h > d/3$.

* * * * *